United States Patent
Agarwal

(10) Patent No.: US 11,277,734 B2
(45) Date of Patent: Mar. 15, 2022

(54) SYSTEMS AND METHODS FOR SECURE AUTOMATIC SYSTEM-NETWORK DUAL-ACTIVATION

(71) Applicant: T-Mobile USA, Inc., Bellevue, WA (US)

(72) Inventor: Pulak Agarwal, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/826,945

(22) Filed: Mar. 23, 2020

(65) Prior Publication Data

US 2021/0297847 A1 Sep. 23, 2021

(51) Int. Cl.
| | |
|---|---|
| *H04W 8/18* | (2009.01) |
| *H04W 24/08* | (2009.01) |
| *H04L 101/654* | (2022.01) |
| *H04W 8/28* | (2009.01) |

(52) U.S. Cl.
CPC ......... *H04W 8/183* (2013.01); *H04L 61/6054* (2013.01); *H04W 8/28* (2013.01); *H04W 24/08* (2013.01)

(58) Field of Classification Search
CPC ....... H04W 8/183; H04W 8/28; H04W 24/08; H04L 61/6054
USPC .......................................................... 370/329
See application file for complete search history.

(56) References Cited

U.S. PATENT DOCUMENTS

| | | | | |
|---|---|---|---|---|
| 10,523,818 | B1* | 12/2019 | Rathnam | H04M 3/537 |
| 2011/0286588 | A1* | 11/2011 | Kim | H04W 4/20 |
| | | | | 379/91.01 |
| 2014/0235230 | A1* | 8/2014 | Raleigh | G06Q 30/0241 |
| | | | | 455/419 |
| 2015/0097669 | A1* | 4/2015 | Li | H04W 8/20 |
| | | | | 340/539.13 |
| 2015/0135292 | A1* | 5/2015 | Lee | H04L 67/1095 |
| | | | | 726/7 |
| 2016/0143004 | A1* | 5/2016 | Stromberg | G06Q 20/32 |
| | | | | 370/329 |
| 2019/0174299 | A1* | 6/2019 | Ullah | H04L 63/102 |
| 2019/0373471 | A1* | 12/2019 | Li | H04L 63/0853 |
| 2020/0059778 | A1* | 2/2020 | Li | H04W 8/18 |

(Continued)

OTHER PUBLICATIONS

Sascha Segan, T-Mobile 'Digits' Lets You Add Numbers to Your Phone, PC Mag, Dec. 7, 2016, https://www.pcmag.com/news/t-mobile-digits-lets-you-add-numbers-to-your-phone.

*Primary Examiner* — Mong-Thuy T Tran

(74) *Attorney, Agent, or Firm* — Troutman Pepper Hamilton Sanders LLP; James E. Schutz; Christopher C. Close, Jr.

(57) ABSTRACT

A method comprising: detecting a delivery trigger indicative of delivery of a new User Equipment (UE) to a user, the new UE having a new subscriber identity module (SIM) card associated with a new phone number, the user having an existing UE with an existing SIM card associated with an existing phone number; and duplicating the existing phone number with the new phone number by instructing network devices to: block incoming telephony messages to the new phone number; spoof outgoing message from the new phone number to present as the existing phone number; duplicate incoming messages to the existing phone number; and deliver the duplicated incoming messages to the new phone number.

18 Claims, 10 Drawing Sheets

(56) References Cited

U.S. PATENT DOCUMENTS

2020/0137566 A1\* 4/2020 Jin ........................ H04W 12/43
2021/0076204 A1\* 3/2021 Goyal ................... H04W 12/50

\* cited by examiner

SYSTEMS AND METHODS FOR SECURE AUTOMATIC SYSTEM-NETWORK DUAL-ACTIVATION

FIELD

Examples of the present disclosure relate generally to system activation, and, more particularly, to systems and methods of automatic activation of a system onto a network.

BACKGROUND

The use of personal electronic devices (e.g., smartphones, tablets, smartwatches, and the like) (user equipment, "UE") continues to proliferate. Such UEs are regularly connected to telephony and data networks, for example, using 4-G and 5-G protocols. To connect to such data networks, UEs regularly include a subscriber identity module ("SIM") card or another network identifier (e.g., international mobile subscriber identity (IMSI)). As will be understood by one of ordinary skill in light of the present disclosure, network identification information ("NII") can be assigned a specific phone number of a telephony network, in addition to a data network. Such NII is often associated with a user account for data and telephone use tracking.

In the related art, when a user orders a new device for their account, the NII of the new device must be manually activated by the user upon receipt. Furthermore, due to a one-to-one NII to phone number correlation, activation of the NII of the new device deactivates the NII of the old device. This process can complicate data transfer between new and old devices. Accordingly, there is a need for improved systems and methods for activating new devices. More specifically, a need exists for providing automatic activation of new devices while persisting network connectivity of existing devices. Aspects of the present disclosure are related to these and other concerns.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, access to data and telephony networks for user equipment ("UE") often necessitates registration and activation of associated network identification information ("NII"). The related art relies upon manual activation by users once the new devices are received. Such activation of new devices disconnects the old device. This related art approach limits the ability to transfer information between new and old devices over the network, and creates overly complicated activation processes. Therefore, it is desirable to have an improved mechanism for activating new devices and providing parallel activation of new and old devices on a network.

In an embodiment, delivery of the new device is monitored, and the new device is activated upon delivery, with a new phone number assigned to the new device. An existing phone number is duplicated for the new device at the network level by spoofing outgoing messages from the new device, duplicating incoming messages, and routing the duplicated messages to both the new and existing phone numbers. The assignment of the new and existing phone numbers can be swapped between the new and old devices. Network activity of the new and old devices can be monitored, and an inactive device can intelligently be deactivated.

The present disclosure is discussed in relation to SIM cards and other NII (or element containing NII). One of ordinary skill will recognize, in light of the present disclosure, that similar systems and methods can be utilized for both SIM-card based and non-SIM-card based communication systems. For example, UEs utilizing Code Division Multiple Access (CDMA) may have network information programmed therein. Thus, any discussion of assigning SIM cards and/or International Mobile Subscriber Identity (IMSI) of a SIM card can be applied directly to the UE utilizing this system. Furthermore, one of ordinary skill that a SIM card may be a physical (removable) SIM card with an Integrated Circuit Card ID as the NII, or an embedded (eSIM) card with an EID as the NII, though these are merely examples.

Reference will now be made in detail to aspects of the disclosed technology, examples of which are illustrated in the accompanying drawings and disclosed herein. Wherever convenient, the same reference numbers will be used throughout the drawings to refer to the same or like parts.

Figure 1:
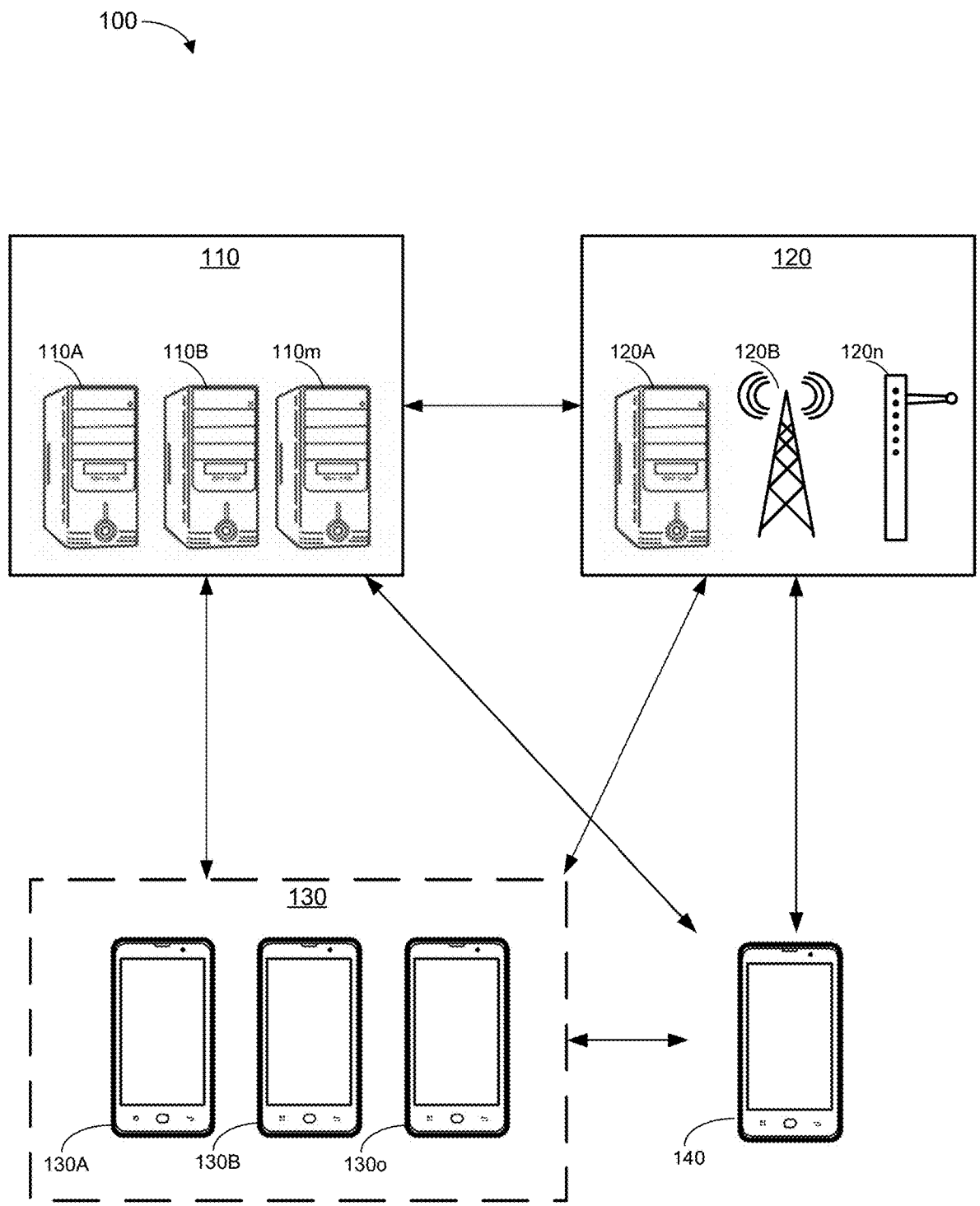
FIG. 1 is a diagram of an example of a system environment for a data quality control application in accordance with aspects of the present disclosure.

As shown in FIG. 1, an example of the present disclosure can comprise a system environment 100 in which endpoint connection and communication in accordance with some examples of the present disclosure can be performed. The components and arrangements shown in FIG. 1 are not intended to limit the disclosed embodiments as these components and features can vary. In FIG. 1, the system environment 100 can include one or more Providers 110A-110*m*, one or more Network Devices 120A-120*n*, one or more Existing UEs 130A-130*o*, and New UE 140. In some examples, Provider 110, Network Device 120, Existing UE 130, New UE 140 can communicate with one another, e.g., through a telephony or data network and/or over an internet connection. Additionally, one or more of Providers 110A-

110m, one or more of Network Devices 120A-120n, and one or more of Existing UEs 130A-130o can communicate with each other (e.g., Existing UE 130A can communicate with Existing UE 130B). Providers 110A-110m, the one or more Network Devices 120A-120n, the one or more Existing UEs 130A-130o, and New UE 140 can each include one or more processors, memories, and/or transceivers. As non-limiting examples, the Existing UEs 130A-130o and New UE 140 can be cell phones, smartphones, laptop computers, tablets, smartwatches, Internet of Things devices (IOT). or other personal computing devices that include the ability to communicate on one or more different types of networks. Providers 110A-110m and/or the one or more Network Devices 120A-120n can include one or more physical or logical devices (e.g., servers, cloud servers, access points, switches, etc.) or drives. Example architectures that can be used to implement Existing UEs 130A-130o, New UE 140, Providers 110A-110m, and Network Devices 120A-120n are described below with reference to FIGS. 6 and 7.

As discussed above, when a user purchases a new device, it must be activated for data and telephony network access. In the related art, this requires a user to manually identify NII (e.g., IMSI of a SIM card or programmed network details) for their new device and request activation of the NII. Due to the one-to-one correlation between NII and phone numbers, activating a new device automatically deactivates the old device. This process can be time-consuming, frustrating, and limit the ability to transfer information between an existing UE and a new UE. Further, this traditional approach complicates creation of backups of the existing UE. Accordingly, aspects of the present disclosure involve new system and methods for providing automatic activation of new devices while persisting network connectivity of existing devices.

Provider 110 can provide connectivity services to UEs 130 and 140. For example, Provider 110 can store user profiles associated with owners of UEs 130 and 140, and monitor and/or instruct Network Devices 120 for allowing UEs 130 and 140 to connect to telephony and data networks. Provider 110 can monitor for a delivery trigger of UE 140, and activate UE 140 when it is received by the appropriate user. When the delivery trigger is received, Provider 110 can activate a new NII of the new UE 140. The new NII may be associated with a new number for the user. Provider 110 can instruct Network Devices 120 to block messages (e.g., calls and telephony messages) incoming to the new number, and spoof outgoing messages (e.g., calls and telephony messages) from the new number to present as the old number. Furthermore, Provider 110 can instruct Network Devices 120 to duplicate incoming messages (e.g., calls and telephony messages) to the original phone number and delivered to both the new NII of UE 140 and an existing NII of Existing UE 130. For example, network routing tables may be updated to establish the spoofing, blocking, and duplicating. Later, Provider 110 can assign the original number to the new NII, assign the new number to the existing NII, and deactivate the existing NII.

Delivery triggers can be received utilizing various methods. The delivery trigger can be a delivery notification from a delivery agent. In embodiments, the delivery trigger can be based on attempted connection information of the new and existing UE 140 and 130. As non-limiting examples, the attempted connection information may include cellular towers and/or internet networks. In other words, when New UE 140 is turned on and attempts to connect to a same cellular tower and/or internet network as Existing UE 130, Provider 110 can determine that New UE 140 is with the user, and activate new UE 140. The delivery trigger can be based on GPS location information of New UE 140. For example, when New UE 130 is powered on, GPS can determine an approximate location of the New UE 130. If the location is within a predetermined area (e.g., within a predetermined area of a user's home or delivery address) and/or within a certain distance from Existing UE 130, Provider 110 can determine that New UE 140 is with the user, and activate new UE 140. The delivery trigger can be based on a connection or attempted connection between new UE 140 and existing UE 130. For example, once New UE 140 is received, the user may power on New UE 140 and attempt a near-field communication (NFC) connection or Bluetooth connection between New UE 140 and Existing UE 130. Existing UE 130 may then send a message to Provider 110 (e.g., through Network Devices 120), indicating the New UE 130 is attempting to connect therewith. In some implementations, delivery triggers may include receipt of a message from the user that New UE 140 has been delivered, such as a text message from Existing UE 130, or an indication through a mobile or web application. While activated, both New UE 140 and Existing UE 130 may be operatively able to send and receive telephone/telephony calls using the original phone number.

Prior to delivery, Provider 110 can capture the new NII shipped to the user and associate it with the user account. For example, Provider 110 can identify a new SIM card packaged with new UE 140 and associate the IMSI of the new SIM card with the user account. In some implementations, the delivery trigger may be identification of the New UE 140 attempting to connect to Provider 110. For instance, when a device (i.e., New UE 140) attempts to connect to Provider 110 with the new NII, Provider 110 can determine that the New UE 140 has been delivered and initialize activation. In other words, Provider 110 can determine that New UE 140 has been delivered after new NII is attempting to connect to the Provider 110 network. In some cases, Provider 110 can assign the new number to the NII (e.g., IMSI), but block calls and data access until after receiving the delivery trigger.

Provider 110 can further control the new NII to be identified with the original phone number. In this case, the old NII can be changed to be associated with the new number (e.g., the old NII and the new NII swap phone number assignments). This swap can be triggered, for example, after a certain time period following activation of New UE 140 (e.g., 3 days after activation). Provider 110 can monitor network activity of New and Existing UEs 140/130, and perform the swap at a point where neither device is active (e.g., when neither device is making a phone call). As will be understood by one of ordinary skill in light of the present disclosure, phone number assignments may not be able to be directly switched in all circumstances. Accordingly, Provider 110 may utilize a third NII (e.g., a transfer NII) to effect the reassignment. The transfer NII may be a real or virtual SIM card registered to Provider 110. Provider 110 can transfer the new number from new NII to transfer NII, transfer the existing number from the existing NII to the new NII, and transfer the new number from the transfer NII to the existing NII. Alternatively, Provider 110 can transfer the existing number from existing NII to transfer NII, transfer the new number from the new NII to the existing NII, and transfer the existing number from the transfer NII to the new NII.

After the transfer, Provider 110 can deactivate the existing NII. The deactivation can be triggered based on, for example, a time-out (e.g., 7-14 days after activation of new UE 140), upon return of existing UE 130, or upon a user indication (e.g., by a user accessing an account page of a user account and indicating the return of existing UE 130). In some cases, a user may decide that they want to keep both Existing and New UEs 130/140. Accordingly, the user may access their account (e.g., online, via telephone, or via an app on Existing or New UE 130/140) and indicate to Provider 110 that the user will not be returning either device. In response, Provider 110 may avoid deactivating existing NII.

In some circumstances, a user may switch an existing SIM card in the existing UE and a new SIM card. For example, when new UE 140 is received, the user may remove the existing SIM card from existing UE 130, remove the new SIM card from new UE 140, insert the existing SIM card into new UE 140, and insert new SIM card into existing UE 130. In such circumstances, deactivation of existing SIM card will deactivate new UE 140. Accordingly, Provider 110 can monitor network activity on both the new and existing SIM cards. When ready to deactivate existing UE 130, Provider 110 can determine which of existing and new SIM cards has been utilized less recently, and deactivate that SIM card. If the existing SIM card has more recent activity, Provider 110 can avoid switching the numbers and/or switch the numbers again (e.g., as described above). This functionality is also useful for addressing a situation where the user determines that they would prefer to keep existing UE 130 (i.e., and return new UE 140).

Network devices 120 provide data and network connectivity to UE 130/140. Network devices 120 can include various network entities such as, for example, a home location register (HLR), home subscriber service (HSS), a third-generation partnership project authentication, authorization, and accounting (3GPP AAA) server, or another server or component. Network devices 120 may route telephone and data communications with UE 130/140. Network devices 120 may be configured to duplicate telephone calls and telephone messages and transmit the messages to a plurality of NII (e.g., NII of new and existing UEs 140/130), for example, under direction of Providers 110. Network devices 120 may include one or more domain maps that determine how to route phone numbers to specific NII. Providers 110 may update the mapping information in accordance with changes between number-to-NII associations. One or more servers that perform call routing and/or whitelisting functions (e.g., AAA server 826 discussed below with reference to FIG. 8) may duplicate the call routing and output the call to new and existing UEs 140/130.

In some examples, Providers 110A-110m, Network Devices 120A-120n, and UEs 130A-130o/140 may be associated with respective entities. For example, each Provider 110 may be a physical device (e.g., server, access point, or network node) controlled by a cellular provider of a plurality of cellular providers or one or more business entities. Similarly, each Network Device 120 may be maintained or associated with a cellular provider among the plurality of cellular providers, e.g., for cellular or data service. Each UE 130/140 may subscribe to a cellular provider among the plurality of cellular providers. Providers 110A-110m may communicate with Network Devices 120A-120n associated with a same cellular provider. UEs 130A-130o may likewise communicate with Network Devices 120A-120m associated with a same cellular provider.

Figure 2:
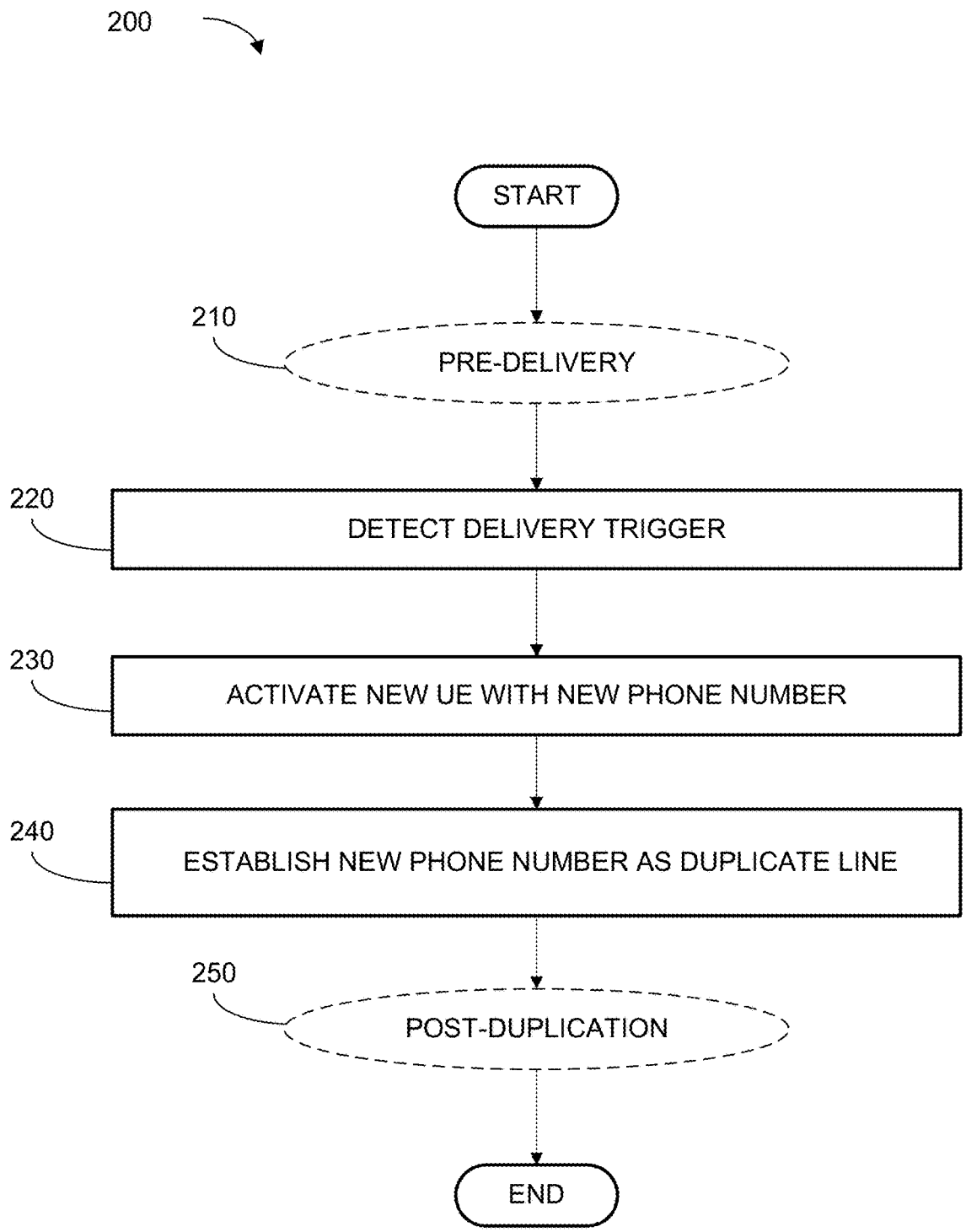
FIG. 2 is a flowchart depicting automated activation in accordance with aspects of the present disclosure.

FIG. 2 is a flowchart of an example of a method 200 for providing automated activation in accordance with aspects of the present disclosure. The flowchart is from the perspective of Provider 110 (e.g., Providers 110A-110m) in communication with Network Device 120 (e.g., one or more Network Devices 120A-120n). Provider 110 can also be in communication (or potential communication) with an Existing UE 130 (e.g., Existing UE 130A-130o) and/or New UE 140. Provider 110 may provide activation services for activation of New UE 140.

At 220, Provider 110 detects a delivery trigger indicative of user receipt of new UE 140. Provider 110 can detect delivery triggers in various ways. For example, Provider 110 can receive a delivery notification from a delivery agent. In embodiments, the delivery trigger can be based on attempted connection information of the new and existing UE 140 and 130. For example, when New UE 140 is turned on, it will attempt to access a cellular network (e.g., a cellular access point or an attempted cellular access point) using the new NII (e.g., through Network Devices 120). Provider 110 can receive network access point(s) identification of the new NII from Network Devices 120. Likewise, Provider 110 can receive network access point(s) identification of the existing NII of Existing UE 130. Provider 110 can compare this access information and, if matching, detect the delivery trigger.

As another example, a delivery trigger can be based on location information of New UE 140. For example, when New UE 130 is powered on, GPS and/or triangulation can determine an approximate location of the New UE 130. If the location is within a predetermined area (e.g., within a predetermined area of a user's home or delivery address) and/or within a certain distance from Existing UE 130, Provider 110 can detect the delivery trigger. Provider 110 can triangulate a location of New UE 140 based on the location of one or more attempted network access points (e.g., received from Network Devices 120).

In some cases, Provider 110 may receive a delivery trigger from Existing UE 130. For instance, once New UE 140 is received, the user may power on New UE 140 and attempt a near-field communication (NFC) connection or Bluetooth connection between New UE 140 and Existing UE 130. Provider 110 (e.g., through Network Devices 120) may receive the delivery trigger from Existing UE 130, indicating the New UE 130 is attempting to connect therewith.

At 230, Provider 110 can activate the new NII of New UE 140. As will be understood by one of ordinary skill, phone numbers are uniquely assigned to NII. Accordingly, Provider 110 can assign a new phone number to the new NII. In some cases, Provider 110 can assign the new phone number to the new NII before receiving the delivery trigger. Provider 110 can also or alternatively authorize communication from the new phone number (e.g., in a circumstance where the new phone number is already assigned either previously by Provider 110 or by some third-party).

At 240, Provider 110 can establish the new phone number as a duplicate line of the original phone number (e.g., the user's existing phone number). Provide 110 can instruct Network Devices 120 to block calls incoming to the new number, and spoof outgoing calls to from the new number to present as the old number. Furthermore, Provider 110 can instruct Network Devices 120 to duplicate incoming calls to the original phone number and deliver the calls to both the new NII of UE 140 and an existing NII of Existing UE 130.

As shown in FIG. 2, Provider 110 can further perform pre-delivery activity at 210 (e.g., before detecting the delivery trigger). For example, Provider 110 can capture the new NII shipped to the user and associate it with a user account. Provider 110 can identify a new SIM card packaged with new UE 140 and associate the IMSI of the new SIM card with the user account. The new number can be associated with the IMSI, but with calls and data access blocked until after receiving the delivery trigger and the new number being established as a duplicate line. Provider 110 can notify Network Devices 120 of the assignment and blocking.

As shown in FIG. 2, Provider 110 can further perform post-duplication activity at 250 (e.g., before detecting the delivery trigger). For example, Provider 110 can assign the original phone number to new NII, such as through swapping the phone numbers assigned to new and existing NII, as discussed in greater detail with reference to FIGS. 3A-4B. Additionally, Provider 110 can deactivate either the existing or new NII as discussed in greater detail with reference to FIG. 5.

Figure 3A:
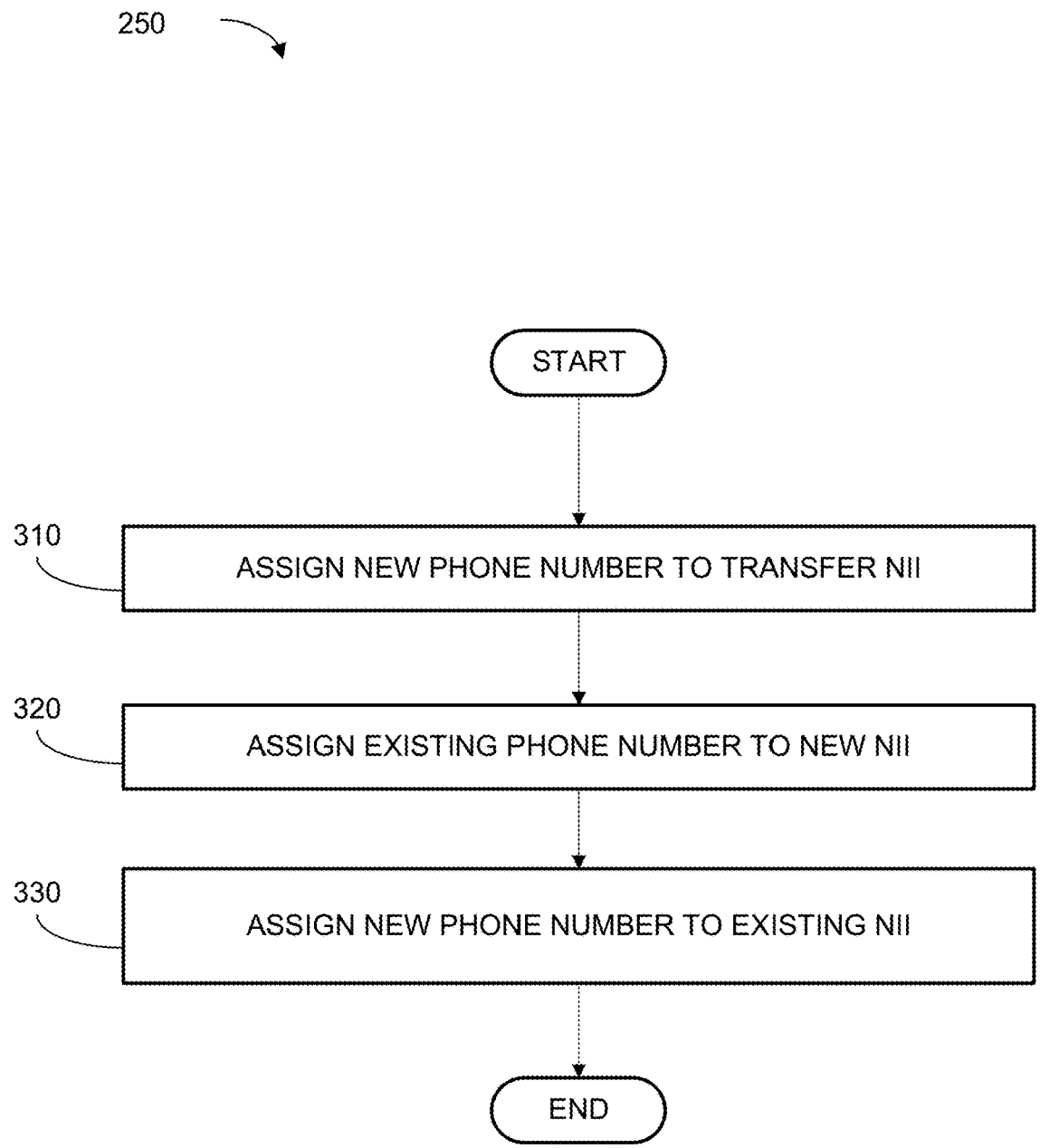
FIG. 3A is a flowchart depicting swapping phone number assignments in accordance with aspects of the present disclosure.
Figure 3B:
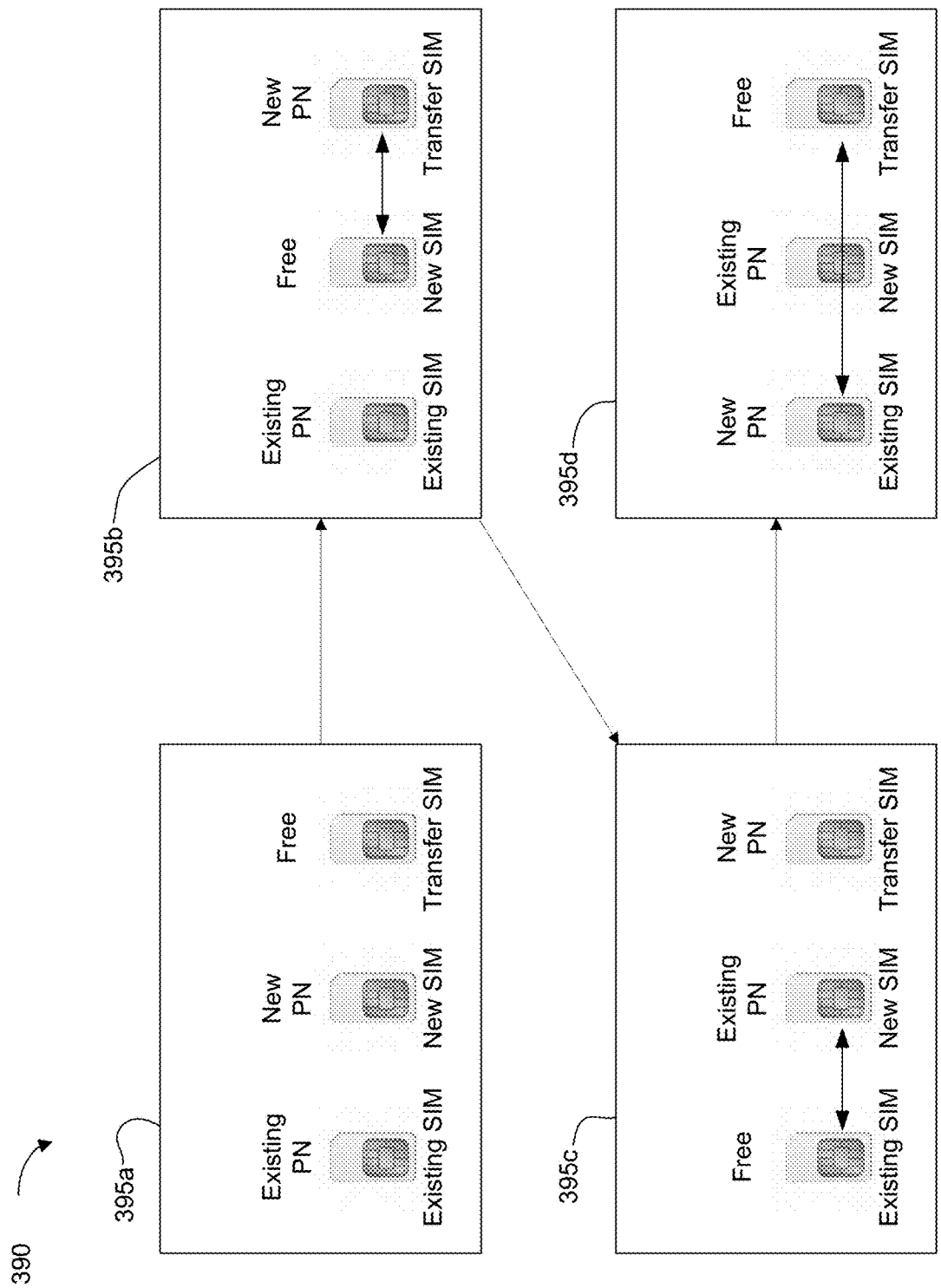
FIG. 3B is a flow diagram illustrating a swapping method in accordance with aspects of the present disclosure.

FIG. 3A is a flowchart of an example of a method for swapping phone number assignments between the new and existing NII in accordance with aspects of the present disclosure. The flowchart is from the perspective of Provider 110 (e.g., Providers 110A-110m) in communication with Network Device 120 (e.g., one or more Network Devices 120A-120n). Provider 110 can also be in communication (or potential communication) with an Existing UE 130 (e.g., Existing UE 130A-130o) and/or New UE 140. Provider 110 may provide activation services for activation of New UE 140. In the related art, swapping phone numbers is not readily possible because dual assignments cannot be made simultaneously. That is, when a phone number is assigned to an NII, the NII releases any previous assigned number, as a phone number can only be assigned to one NII and an NII can only have one assigned phone number. As releasing a phone number can enable it to be reassigned, aspects of the present disclosure utilize a third "transfer" NII to effectuate swapping. As will be understood by one of ordinary skill, transfer NII may be a physical or virtual electronic SIM card. FIG. 3B is a flow diagram 390 that illustrates the swapping method of FIG. 3A.

At the start (395a), the existing phone number is assigned to the existing NII, the new phone number is assigned to the new NII, and the transfer NII is available for assignment (e.g., "free"). At 310, Provider 110 assigns the new phone number to transfer NII. Assigning the new phone number to transfer NII makes the new NII available (395b). At 320, Provider 110 assigns the existing phone number to the new NII. Assigning the existing phone number to the new NII frees the existing NII (395c). At 330, Provider 110 assigns the new phone number to the existing NII. Assigning the new phone number to the existing NII makes the transfer NII available (395d). Provider 110 can record assignment of the numbers with Network Devices 120 (e.g., instruct network devices of the various number assignments as they are made). If the Provider 110 later deactivates the existing NII, the existing phone number remains assigned to the new NII.

Figure 4A:
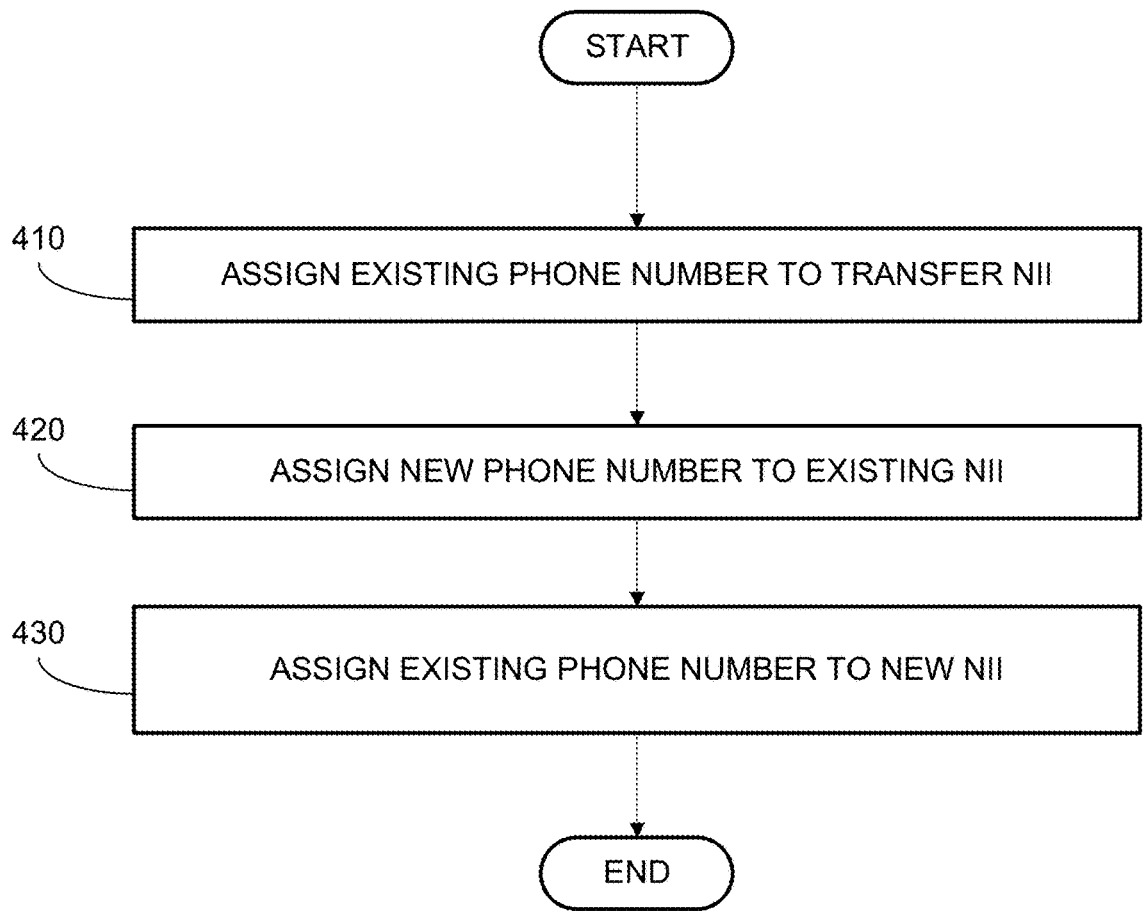
FIG. 4A is a flowchart depicting swapping phone number assignments in accordance with aspects of the present disclosure.
Figure 4B:
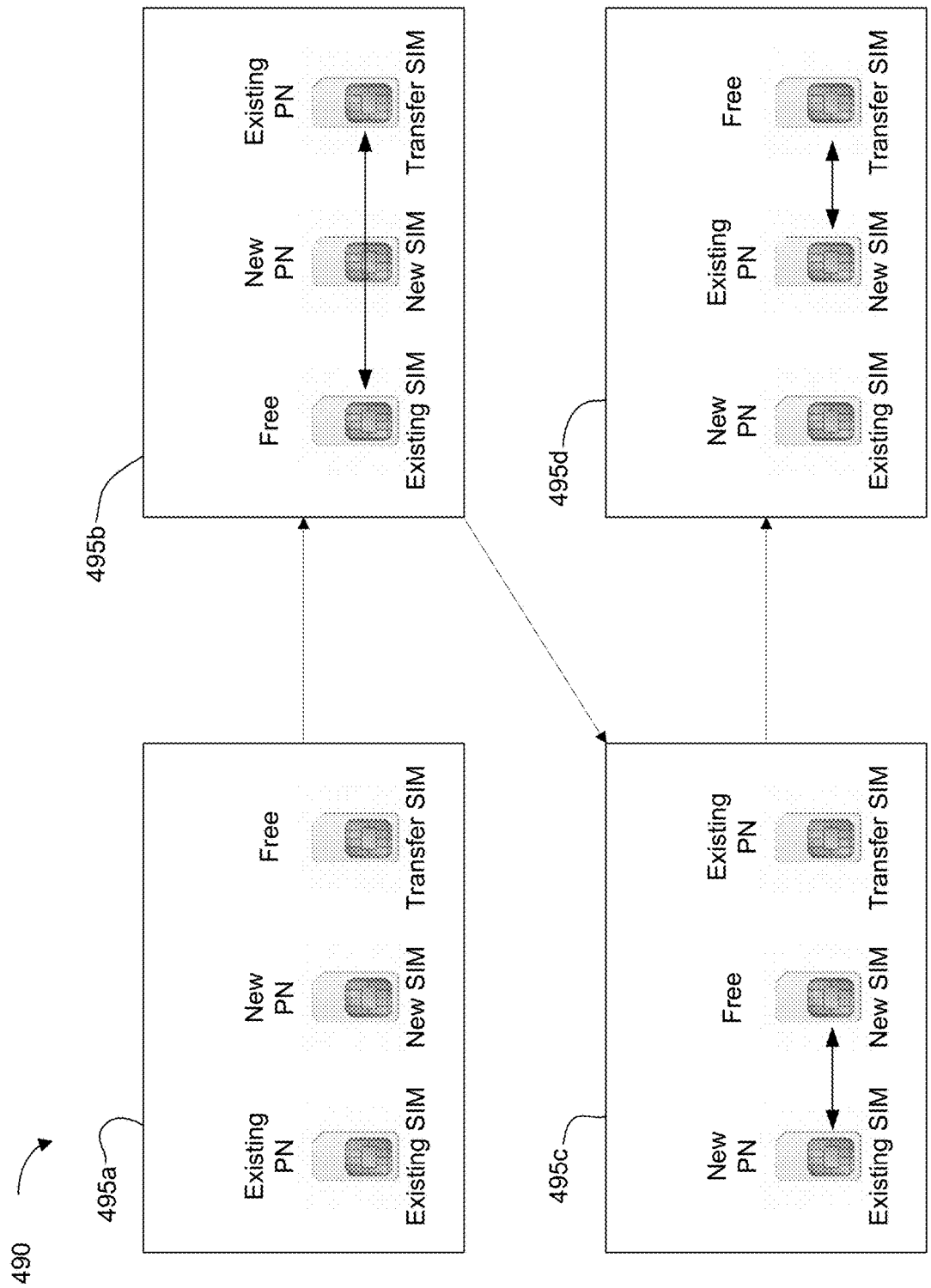
FIG. 4B is a flow diagram illustrating a swapping method in accordance with aspects of the present disclosure.

FIG. 4A is a flowchart of an example of a method for swapping phone number assignments between the new and existing NII in accordance with aspects of the present disclosure. The flowchart is from the perspective of Provider 110 (e.g., Providers 110A-110m) in communication with Network Device 120 (e.g., one or more Network Devices 120A-120n). Provider 110 can also be in communication (or potential communication) with an Existing UE 140 (e.g., Existing UE 140A-140o) and/or New UE 140. Provider 110 may provide activation services for activation of New UE 140. In the related art, swapping phone numbers is not readily possible because dual assignments cannot be made simultaneously. That is, when a phone number is assigned to an NII, the NII releases any previously assigned number, as a phone number can only be assigned to one NII and an NII can only have one assigned phone number. As releasing a phone number can enable it to be reassigned, aspects of the present disclosure utilize a third "transfer" NII to effectuate swapping. As will be understood by one of ordinary skill, transfer NII may be a physical or virtual electronic NII. FIG. 4B is a flow diagram 490 that illustrates the swapping method of FIG. 4A.

At the start (495a), the existing phone number is assigned to the existing NII, the new phone number is assigned to the new NII, and the transfer NII is available for assignment (e.g., "free"). At 410, Provider 110 assigns the existing phone number to transfer NII. Assigning the new phone number to transfer NII makes the existing NII available (495b). At 420, Provider 110 assigns the new phone number to the existing NII. Assigning the new phone number to the existing NII frees the existing NII (495c). At 430, Provider 110 assigns the existing phone number to the new NII. Assigning the existing phone number to the new NII makes the transfer NII available (495d). Provider 110 can record assignment of the numbers with Network Devices 120 (e.g., instruct network devices of the various number assignments as they are made). If the provider 110 later deactivates the existing NII, the existing phone number remains assigned to the new NII.

In order to limit disruption to the user, Provider 110 can schedule swapping at a time when the user is unlikely to need phone access. For example, Provider 110 can perform the swapping in the middle of the night (e.g., 4 AM local time). Furthermore, utilizing methods described herein, the swapping process can be completed in milliseconds, further limiting potential disruption. Additionally, in some cases, Provider 110 can monitor network activity of the new and existing NII and only perform the swapping only when network activity is absent (or indicative of only background use or New and Existing UE 140 and 130 being powered-off). Provider 110 can trigger the swapping according to a predetermined schedule (e.g., 3 days) or as soon as possible after the delivery trigger.

Figure 5:
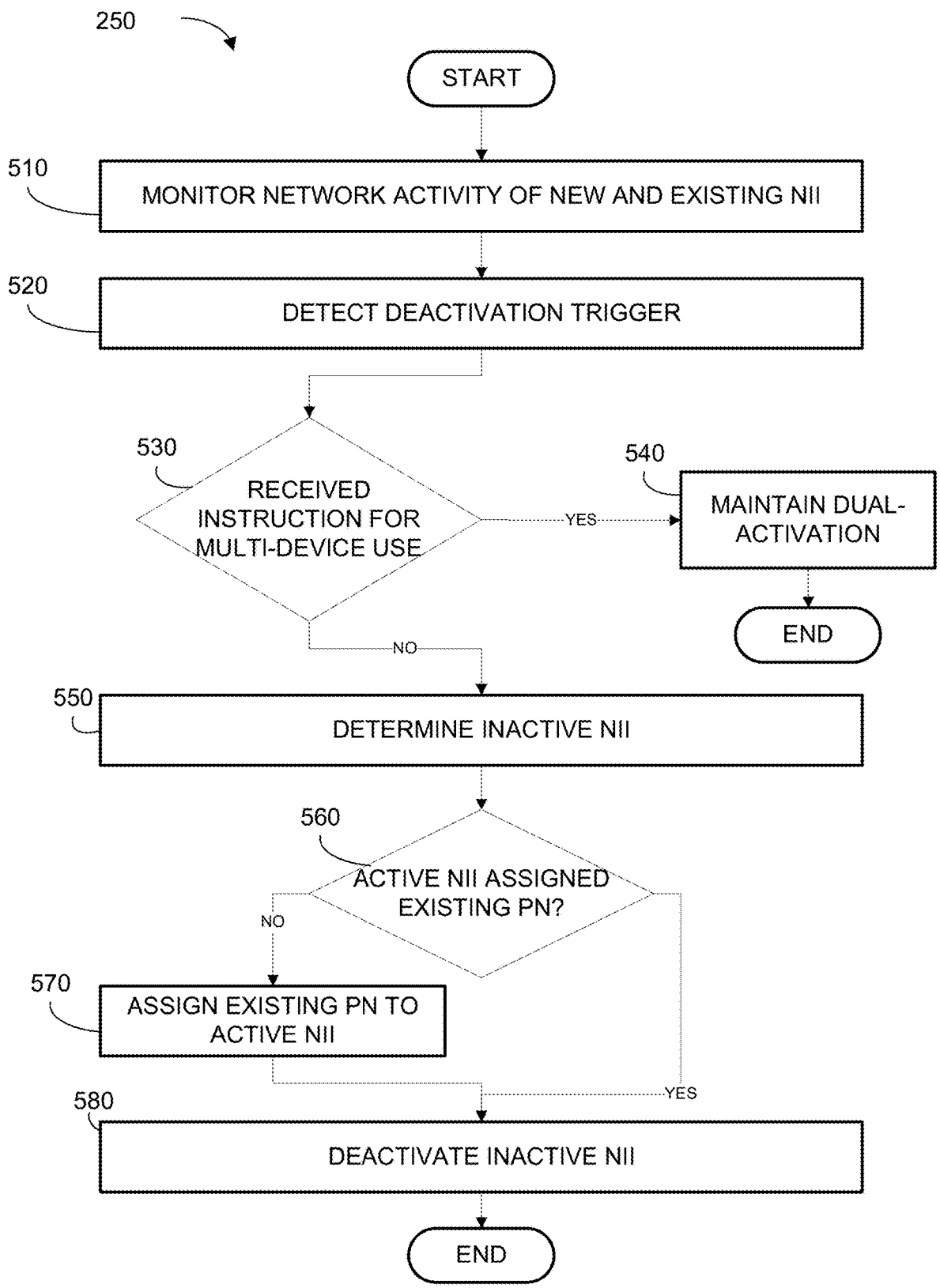
FIG. 5 is a flowchart of deactivation of one of new and existing NII in accordance with aspects of the present disclosure.

FIG. 5 is a flowchart of an example of a method for deactivation of one of the new and existing NII in accordance with aspects of the present disclosure. The deactivation method may be performed with or without the phone number swapping (e.g., as discussed above with reference to FIGS. 3A-4B). The deactivation described with reference to FIG. 5 is capable of intelligently deactivating an unused NII regardless of whether the user keeps New UE 140 or Existing UE 130, and regardless of whether the user swaps new SIM card and existing SIM card.

At 510, Provider 110 monitors network activity of the new and existing NII. For example, Provider 110 can track phone and data use associated with the new and existing NII. At 520, Provider 110 detects a deactivation trigger. The deactivation trigger may be, for example, a time out based on when the delivery trigger was detected (e.g., one week or 15 days). In some cases, a user may notify Provider 110 of returning the Existing or New UE 130/140 to the associated provider. In some implementations, Provider 110 can receive a shipment notification from a delivery agent, and use the same as a deactivation trigger, or the deactivation trigger may be receiving one of the Existing and New Devices 130/140 shipped to Provider 110. In some cases, when a time-out or other deactivation trigger is received, a NII having a least recent network activity may be deactivated automatically.

At 530, Provider 110 can determine whether an instruction for multi-device use has been received. For example, Provider 110 may issue a notification (e.g., text message) to Existing and/or New UE 130/140 that one of the devices will soon be deactivated (e.g., based on a timeout). The user may select a link on the text message indicating that they would like to continue to use both Existing and New UEs 130/140. In this case, (530-Yes), Provider 110 can maintain dual-activation of the New and Existing UEs 140/130.

If no instruction for multi-device use is received (530-No), at 550, Provider 110 determines an inactive NII between the new and existing NII based on the network activity. At 560, Provider 110 determines whether the active NII is assigned the existing phone number. If it is not (560-No), Provider 110 assigns the existing phone number to the active card at 570 and deactivates the inactive card at 580. The assignment of the existing phone number can be similar to the swapping described above with reference to FIGS. 3A-4B, but these are merely examples. If the active NII is already assigned the existing phone number (560-Yes), Provider 110 deactivates the inactive NII at 580. Deactivation can include de-assigning the new phone number from the inactive NII, and instructing Network Devices 120 to no longer duplicate incoming phone messages to the existing phone number or spoof outgoing messages form the new phone number. Deactivation can also include removal of the duplicating phone number from the associated customer account.

Figure 6:
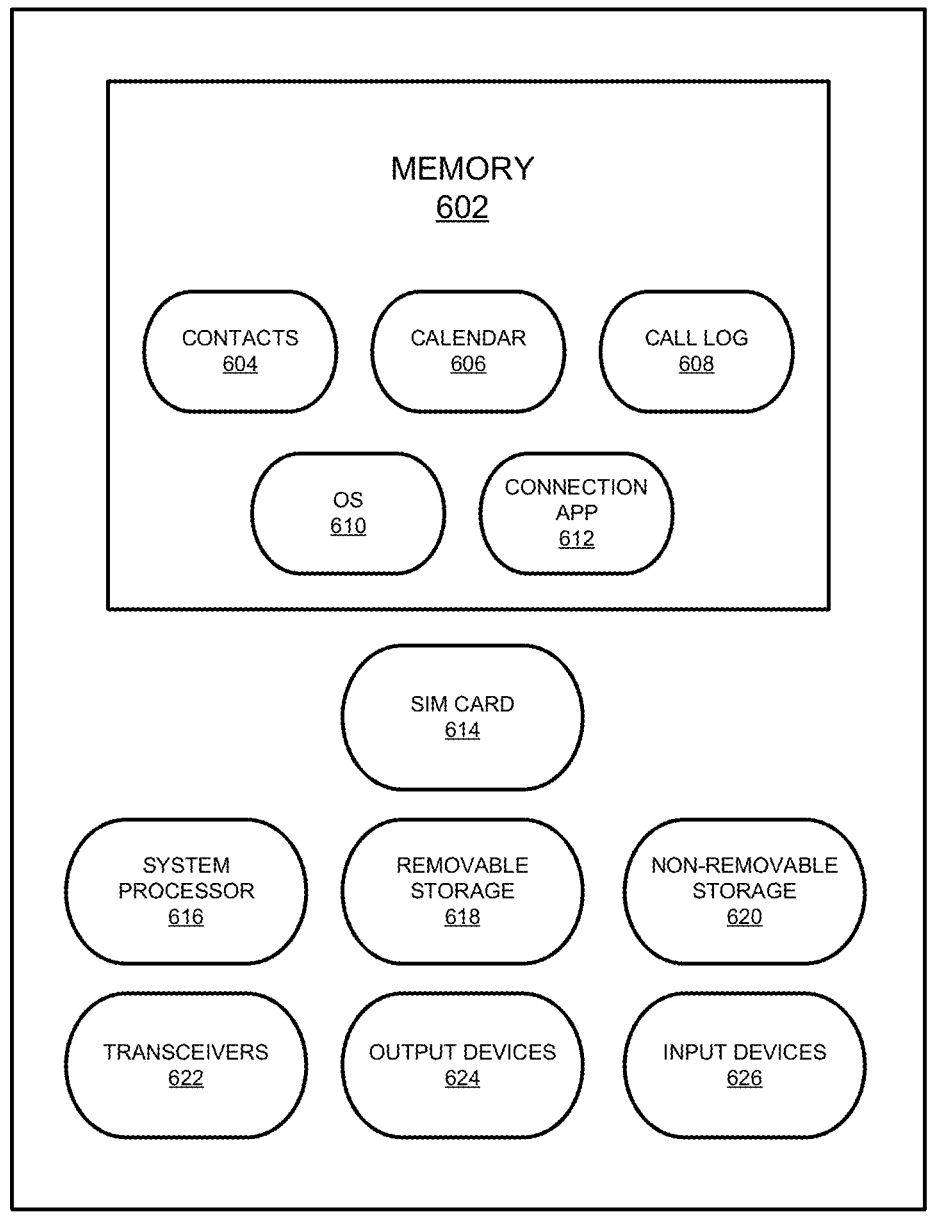
FIG. 6 is an example of a UE for use with the systems and methods disclosed herein, in accordance with some examples of the present disclosure.

As shown in FIG. 6, some, or all, of the system environment 100 and methods 200 and 250 may be performed by, and/or in conjunction with, UE 130/140. For clarity, UE 130/140 is described herein generally as a cell phone or smartphone. One of skill in the art will recognize, however, that the system environment 100 and methods 200 and 250 may also be used with a variety of other electronic devices, such as, for example, tablet computers, laptops, desktops, and another network (e.g., cellular or IP network) connected devices from which a call may be placed, a text may be sent, and/or data may be received. These devices are referred to collectively herein as UE 130/140. UE 130/140 may comprise a number of components to execute the above-mentioned functions and apps. As discussed below, UE 130/140 may comprise memory 602 including many common features such as, for example, contacts 604, a calendar 606, a call log (or, call history) 608, operating system (OS) 610, one or more applications, such as connection app 612, and a SIM card 614.

UE 130 may also comprise one or more system processors 616. In some implementations, the system processor(s) 616 can include a central processing unit (CPU), a graphics processing unit (GPU), or both CPU and GPU, or any other sort of processing unit. UE 130 may also include one or more of removable storage 618, non-removable storage 620, one or more transceiver(s) 622, output device(s) 624, and input device(s) 626.

In various implementations, the memory 602 may be volatile (such as random-access memory (RAM)), non-volatile (such as read-only memory (ROM), flash memory, etc.), or some combination of the two. The memory 602 may include all, or part, of the functions 604, 606, 608, 612, and the OS 610 for UE 130, among other things.

The memory 602 may also comprise contacts 604, which can include names, numbers, addresses, and other information about the user's business and personal acquaintances, among other things. In some examples, the memory 602 may also include a calendar 606, or other software, to enable the user to track appointments and calls, schedule meetings, and provide similar functions. In some examples, the memory 602 may also comprise the call log 608 of calls received, missed, and placed from UE 130. As usual, the call log 608 may include timestamps for each call for use by the system environment 100. Of course, the memory 602 can also include other software such as, for example, e-mail, text messaging, social media, and utilities (e.g., calculators, clocks, compasses, etc.).

The memory 602 may also include the OS 610. Of course, the OS 610 varies depending on the manufacturer of UE 130 and currently comprises, for example, iOS 12.1.4 for Apple products and Pie for Android products. The OS 610 contains the modules and software that supports a computer's basic functions, such as scheduling tasks, executing applications, and controlling peripherals.

SIM card 614 may hold and an IMSI and an authentication key that validates the IMSI. On startup, UE 130 (e.g., system processor 616) obtains the IMSI from the SIM card 614 and relays it to the network (e.g., Network Devices 120). The network takes the IMSI and looks in its internal database for that IMSI's known authentication key. The network generates a random number and signs it (e.g., hashes) with the authentication key to create an authentication check number. UE 130 receives the random number (e.g., through transceiver 622) from the network and forwards it to the SIM card 614, which signs it (e.g., hashes it) with its authentication key to create an authentication check number. This number is relayed back to the network, which checks it against its authentication check number to determine whether SIM card 614 is legitimate and access is granted.

UE 130 may also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 can store some, or all, of the functions 604, 606, 608, 612, and the OS 610.

Non-transitory computer-readable media may include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by UE 130. Any such non-transitory computer-readable media may be part of UE 130 or may be a separate database, databank, remote server, or cloud-based server.

In some implementations, the transceiver(s) 622 may include any sort of transceivers known in the art. In some examples, the transceiver(s) 622 can include a wireless modem to facilitate wireless connectivity with the other UEs, the Internet, and/or an intranet via a cellular connection. Further, the transceiver(s) 622 may include a radio transceiver that performs the function of transmitting and receiving radio frequency communications via an antenna (e.g., Wi-Fi or Bluetooth®). In other examples, the transceiver(s) 622 may include wired communication components, such as a wired modem or Ethernet port, for communicating with the other UE or the provider's Internet-based network. In this case, the transceiver(s) 622 can also enable UE 130 to communicate with the Providers 110 and Network Devices 120, as described herein.

In some implementations, output device(s) 624 includes any sort of output devices known in the art, such as a display (e.g., a liquid crystal or thin-film transistor (TFT) display), a touchscreen display, speakers, a vibrating mechanism, or a tactile feedback mechanism. In some examples, output device(s) 624 can play various sounds based on, for example, whether UE 130 is connected to a network, the type of call being received (e.g., video calls vs. voice calls), the number of active calls, etc. Output device(s) 624 also include ports for one or more peripheral devices, such as headphones, peripheral speakers, or a peripheral display.

In various implementations, input device(s) 626 includes any sort of input devices known in the art. The input device(s) 626 may include, for example, a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 7:
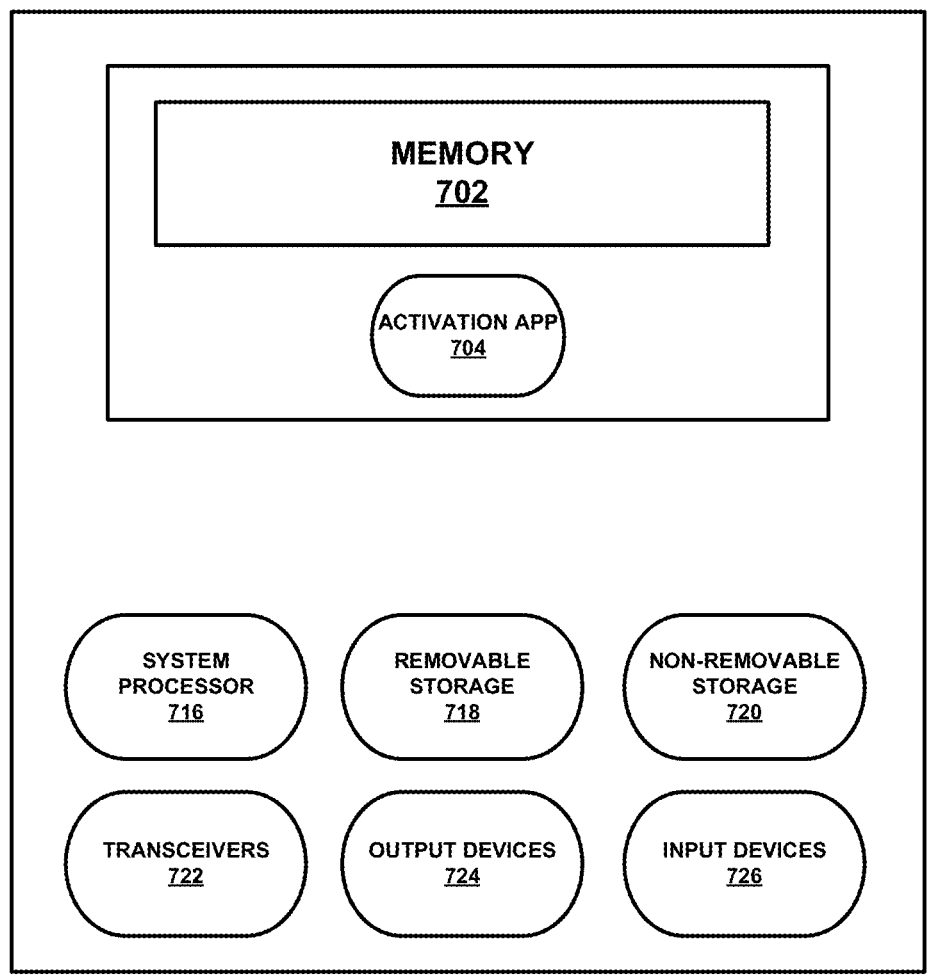
FIG. 7 is an example of a server for use with the systems and methods disclosed herein, in accordance with some examples of the present disclosure.

As shown in FIG. 7, the system environment 100 and methods 200 and 250 may also be used in conjunction with a server 700 (e.g., Provider 110 and/or Network Devices 120). The server 700 can comprise, for example, a desktop or laptop computer, a server, bank of servers, or cloud-based server bank. Thus, while the server 700 is depicted as single standalone servers, other configurations or existing components could be used. In some examples, the server 700 may comprise existing network entities such as, for example, a home location register (HLR), home subscriber service (HSS), a third-generation partnership project authentication, authorization and accounting (3GPP AAA) server, or another server or component. The server 700 may implement aspects of Provider 110 and/or Network Devices 120.

The server 700 may comprise a number of components to execute the above-mentioned functions and apps. As discussed below, the server 700 may comprise memory 702 including many common features such as, for example, the OS 710. In various implementations, the memory 702 may be volatile (such as random access memory (RAM)), nonvolatile (such as read-only memory (ROM), flash memory, etc.), or some combination of the two. The memory 702 may include all, or part, of the functions of a activation app 704, among other things.

The memory 702 may also include the OS 710. Of course, the OS 710 varies depending on the manufacturer of the server 700 and the type of component. Many servers, for example, run Linux or Windows Server. Dedicated cellular routing servers may run specific telecommunications OS 710. The OS 710 contains the modules and software that supports a computer's basic functions, such as scheduling tasks, executing applications, and controlling peripherals.

Activation app 704 may control activation of new SIM cards, swapping of numbers between SIM cards, and deactivation of existing SIM cards. In some implementations, the system processor(s) 716 can include a central processing unit (CPU), a graphics processing unit (GPU), or both CPU and GPU, or any other sort of processing unit. The server 700 may also include one or more of removable storage 718, non-removable storage 720, one or more transceiver(s) 722, output device(s) 724, and input device(s) 726.

The server 700 may also include additional data storage devices (removable and/or non-removable) such as, for example, magnetic disks, optical disks, or tape. Such additional storage is illustrated in FIG. 7 by removable storage 718 and non-removable storage 720. The removable storage 718 and non-removable storage 720 may store some, or all, of the OS 710, hypervisor 713, and connection app 704.

Non-transitory computer-readable media may include volatile and nonvolatile, removable and non-removable tangible, physical media implemented in technology for storage of information, such as computer readable instructions, data structures, program modules, or other data. The memory 702, removable storage 718, and non-removable storage 720 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which may be used to store the desired information, and which can be accessed by the server 700. Any such non-transitory computer-readable media may be part of the server 700 or may be a separate database, databank, remote server, or cloud-based server.

In some implementations, the transceiver(s) 722 include any sort of transceivers known in the art. In some examples, the transceiver(s) 722 may include a wireless modem to facilitate wireless connectivity with UEs 130, additional servers, the Internet, and/or an intranet via a cellular connection. Further, the transceiver(s) 722 may include a radio transceiver that performs the function of transmitting and receiving radio frequency communications via an antenna (e.g., Wi-Fi or Bluetooth®). In other examples, the transceiver(s) 722 may include wired communication components, such as a wired modem or Ethernet port, for communicating with the other UEs or the provider's Internet-based network. The transceiver(s) 722 may transmit requests to and receive attestation information from Network Device(s) 120, and send messages to/from UEs 130/140, among other things.

In some implementations, the output device(s) 724 may include any sort of output devices known in the art, such as a display (e.g., a liquid crystal or thin-film transistor (TFT) display), a touchscreen display, speakers, a vibrating mechanism, or a tactile feedback mechanism. In some examples, the output devices may play various sounds based on, for example, whether the server 700 is connected to a network, the type of data being received (e.g., a match vs. a request for service listings), when SIM-OTA messages are being transmitted, etc. Output device(s) 724 may also include ports for one or more peripheral devices, such as headphones, peripheral speakers, or a peripheral display.

In various implementations, input device(s) 726 includes any sort of input devices known in the art. For example, the input device(s) 726 may include a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 8:
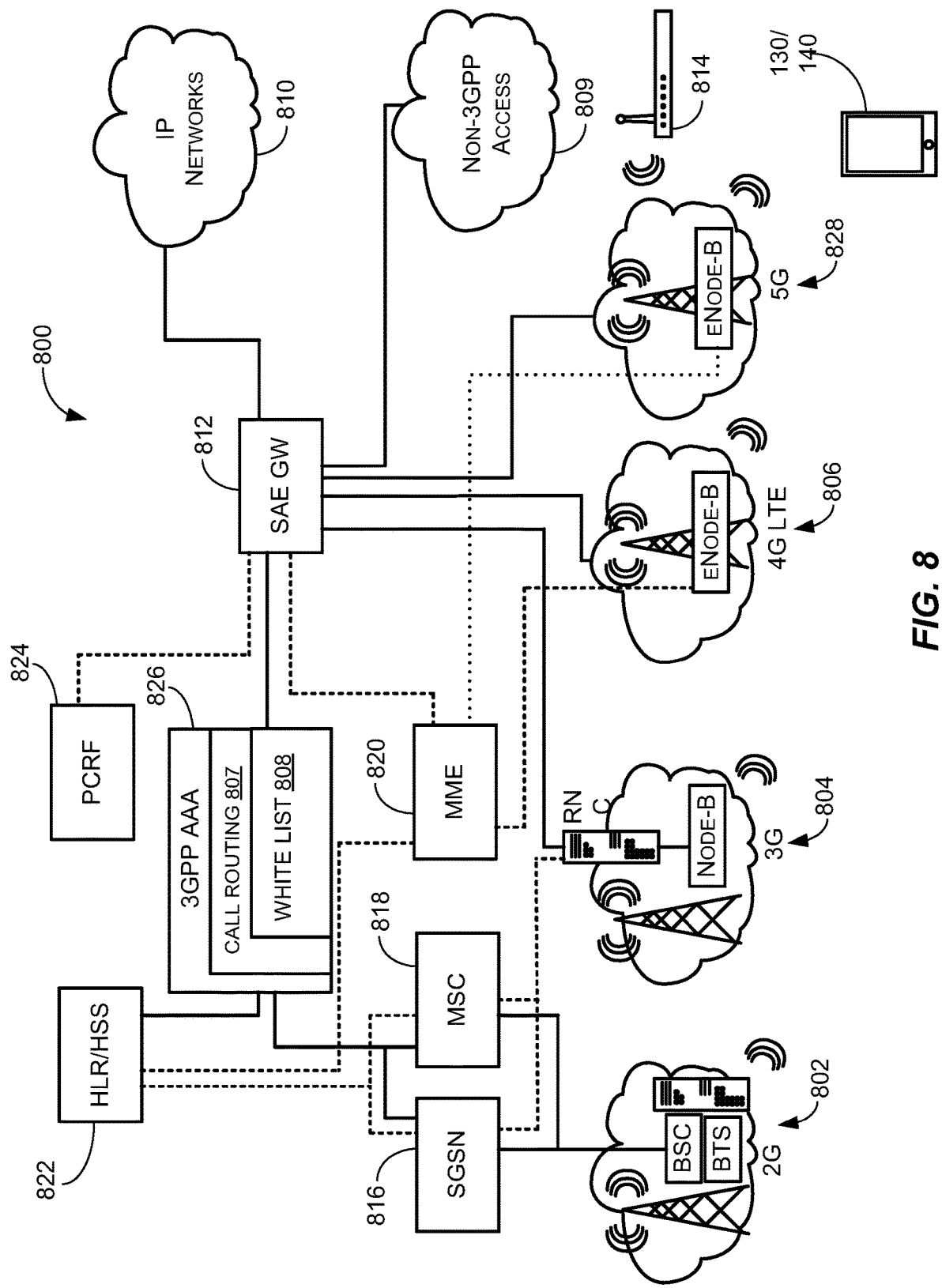
FIG. 8 illustrates an example cellular and internet protocol network for use with some examples of the present disclosure.

FIG. 8 depicts a conventional cellular network 800 including 2G 802, 3G 804, 4G long-term evolution (LTE) 806, and 5G 828 components. Of course, future technologies, such as, for example, 5G and device-to-device (D2D) components could also be included and are contemplated herein. Many of the "back-end" components of network 800 could handle some, or all, of system environment 100 and methods 200 and 250 associated with remote device security attestation and manipulation detection.

As is known in the art, data may be routed from the Internet or other sources using a circuit switched modem connection (or non-3GPP), which provides relatively low data rates, or via IP based packet switched 810 connections, which results is higher bandwidth. LTE system 806, which is purely IP based, essentially "flattens" the architecture, with data going straight from the internet to service architecture evolution gateway (SAE GW) 812 to evolved Node B transceivers 806, enabling higher throughput. UE 130 also has wireless local area network (WLAN) 814 capabilities, in some cases enabling even higher throughput. In some cases, cellular carriers may use WLAN communications in addition to, or instead of, cellular communications to supplement bandwidth.

Serving GPRS support node (SGSN) 816 is a main component of the general packet radio service (GPRS) network, which handles all packet switched data within the network 800 (e.g., the mobility management and authentication of the users). MSC 818 essentially performs the same functions as SGSN 816 for voice traffic. MSC 818 is the primary service delivery node for global system for mobile communication (GSM) and code division multiple access (CDMA), responsible for routing voice calls and short messaging service (SMS) messages, as well as other services (such as conference calls, fax, and circuit switched data). MSC 818 sets up and releases the end-to-end connection, handles mobility and hand-over requirements during the call, and takes care of charging and real-time pre-paid account monitoring.

Similarly, mobility management entity (MME) 820 is the key control-node for 4G LTE network 806 and 5G 828. It is responsible for idle mode UE 130 paging and tagging procedures including retransmissions. MME 820 is involved in the bearer activation/deactivation process and is also responsible for choosing SAE GW 812 for UE 130 at the initial attach and at time of intra-LTE handover involving Core Network (CN) node relocation (i.e., switching from one cell tower to the next when traveling). MME 820 is responsible for authenticating the user (by interacting with the HSS 822 discussed below). The Non-Access Stratum (NAS) signaling terminates at the MME 820 and it is also responsible for generation and allocation of temporary identities to UE 130. The MME 820 also checks the authorization of UE 130 to camp on the service provider's HPLMN or VPLMN and enforces UE 130 roaming restrictions on the VPLMN. MME 820 is the termination point in the network for ciphering/integrity protection for NAS signaling and handles the security key management. MME 820 also provides the control plane function for mobility between LTE 806 and 2G 802/3G 804 access networks with an S3 interface terminating at MME 820 from SGSN 816. MME 820 also terminates an S7a interface towards home HSS 822 for roaming UE 130.

Referring to 5G 828, MME 820 may be configured to respond to an initial attach request by sending a create session request to a network slice selector, also referred to herein as a slice selector and/or a network selector. The create session request may be sent over a logical communication interface that is referred to as an NG4 interface. The NG4 interface typically is used for messaging between the control plane function and the user plane forwarding function of a 5G network. Aspects of the present disclosure may be implemented within containerization of Software Defined Networks (SDN) of 5G nodes, and/or Network Function Virtualization (NfV). As will be understood by one of ordinary skill, SDN decouples traditionally decentralized network control from the physical devices, enabling programmatic control and infrastructure abstraction.

In response to receiving a create session request, the network slice selector may determine which of the available network slices should be used to provide services for UE 130 and may redirect the create session request to the selected network slice. For example, the create session request may be directed to a gateway component of the selected network slice. Specific for a 5G network, the gateway component may comprise a user plane forwarding function.

HSS/HLR 822 is a central database that contains user-related and subscription-related information. The functions of HSS/HLR 822 include functionalities such as mobility management, call and session establishment support, user authentication and access authorization. HSS, which is used for LTE connections, is based on the previous HLR and Authentication Center (AuC) from CGMA and GSM technologies, with each serving substantially the same functions for their respective networks.

The policy and charging rules function (PCRF) 824 is a software node that determines policy rules in network 800. PCRF 824 generally operates at the network core and accesses subscriber databases (e.g., HSS/HLR 822) and other specialized functions, such as enhanced e911 call handling, in a centralized manner. PCRF 824 is the main part of network 800 that aggregates information to and from network 800 and other sources (e.g., IP networks 810). PCRF 824 may support the creation of rules and then may automatically make policy decisions for each subscriber active on network 800. PCRF 824 may also be integrated with different platforms like billing, rating, charging, and subscriber database or may also be deployed as a standalone entity.

Finally, 3GPP AAA server 826 performs authentication, authorization, and accounting (AAA) functions (e.g., call routing 807 and/or white listing 808) and may also act as an AAA proxy server. For WLAN 814 access to (3GPP) IP networks 810 3GPP AAA Server 826 provides authorization, policy enforcement, and routing information to various WLAN components. 3GPP AAA Server 826 may generate and report charging/accounting information, performs offline charging control for WLAN 814, and perform various protocol conversions when necessary.

While several possible examples are disclosed above, examples of the present disclosure are not so limited. While the system environment 100 and methods 200 and 250 above are discussed with reference to use with cellular communications, for instance, the system environment 100 and methods 200 and 250 can be used for other types of wired and wireless communications. In addition, while various functions are discussed as being performed on UE 130, by Provider 110, or on Network Device 120, other components could perform the same or similar functions without departing from the spirit of the present disclosure.

The specific configurations, machines, and the size and shape of various elements can be varied according to particular design specifications or constraints requiring a UE 130/140, server 700, Network Devices 120, system environment 100, network 800, or method 200 and 250 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

An embodiment of the present disclosure may be implemented according to at least the following:

Clause 1: A method including: detecting a delivery trigger indicative of delivery of a new User Equipment (UE) to a user, the new UE having a new subscriber identity module (SIM) card associated with a new phone number, the user having an existing UE with an existing SIM card associated with an existing phone number; and duplicating the existing phone number with the new phone number by instructing network devices to: block incoming telephony messages to the new phone number; spoof outgoing message from the new phone number to present as the existing phone number; duplicate incoming messages to the existing phone number; and deliver the duplicated incoming messages to the new phone number.

Clause 2: A method comprising: detecting a delivery trigger indicative of delivery of a new User Equipment (UE) to a user, the new UE having new network identification information (NII) associated with a new phone number, the user having an existing UE with an existing NII associated with an existing phone number; and duplicating the existing phone number with the new phone number.

Clause 3: The method of Clause 2, wherein duplicating the existing phone number with the new phone number comprising instructing network devices to: block incoming telephony messages to the new phone number; spoof outgoing message from the new phone number to present as the existing phone number; duplicate incoming messages to the existing phone number; and deliver the duplicated incoming messages to the new phone number.

Clause 4: The method of any of Clauses 1-3, wherein the new phone number is assigned to the new NII before detecting the delivery trigger, and the method further comprises disallowing telephony communications to and from the new phone number prior to detecting the delivery trigger.

Clause 5: The method of any of Clauses 1-4, wherein detecting the delivery trigger comprises: receiving indications of an attempted cellular access point of the new NII; receiving indications of a cellular access point of the existing NII; and detecting the delivery trigger as to the cellular access point of the existing NII being a same access point as the attempted cellular access point of the new NII.

Clause 6: The method of any of Clauses 1-5, wherein detecting the delivery trigger comprises one from among a delivery notification from a delivery agent, location information of new UE indicating that the new UE is within a predetermined area, location information of new UE indicating that the new UE is within a predetermined distance from the existing UE, and a notification from the existing UE that the new UE has attempted short-range connection therewith.

Clause 7: The method of Clause 6 further comprising: receiving indications of a plurality of attempted cellular access points of the new NII; and determining an estimated location of the new NII by triangulating the estimated location of the new NII based on known locations of the plurality of attempted cellular access points.

Clause 8: The method of Clause 7 further comprising identifying a new subscriber identity module (SIM) shipped with new UE, and associating an International Mobile Subscriber Identity (IMSI) of the new SIM with the user.

Clause 9: The method of any of Clauses 1-8 further comprising swapping phone number assignments between the new and existing NII.

Clause 10: The method of Clause 9, wherein swapping phone number assignments between the new and existing NII comprises: assigning the new phone number to a transfer NII, freeing the new NII; assigning the existing phone number to the new NII, freeing the existing NII; and assigning the new phone number to the existing NII, freeing the transfer NII.

Clause 11: The method of Clause 9, wherein swapping phone number assignments between the new and existing NII comprises: assigning the existing phone number to a transfer NII, freeing the existing NII; assigning the new phone number to the existing NII, freeing the new NII; and assigning the existing phone number to the new NII, freeing the transfer NII.

Clause 12: The method of any of Clauses 1-11 further comprising: monitoring network activity of the new and existing NII; detecting a deactivation trigger; determining an inactive NII and an active NII of the new and existing NII based on the monitored network activity; and deactivating the inactive NII.

Clause 13: The method of Clause 12 further comprising: determining that the existing phone number is assigned to the inactive NII; and assigning the existing phone number to the active NII before deactivating the inactive NII.

Clause 14: The method of Clause 12 or Clause 13, wherein deactivating the inactive NII comprises de-duplicating the existing phone number with the new phone number.

Clause 15: The method of any of Clauses 12-14, wherein detecting the deactivation trigger comprises one from among a time out, a notification from the user, and a shipment notification from a delivery agent.

Clause 16: The method of any of Clause 1-15 further comprising assigning the new phone number to the NII.

Clause 17: A system comprising: at least one processor; and at least one memory having stored thereon instructions that, when executed by the at least one processor, controls the at least one processor to: detect a delivery trigger indicative of delivery of a new User Equipment (UE) to a user, the new UE having new network identification information (NII) the user having an existing UE with an existing NII associated with an existing phone number; activate the new UE and assign a new phone number to the new NII; and duplicate the existing phone number with the new phone number.

Clause 18: The system of Clause 17, wherein the instructions, when executed by the at least one processor, controls the at least one processor to duplicate the existing phone number by instructing network devices to: block incoming telephony messages to the new phone number; spoof outgoing message from the new phone number to present as the existing phone number; duplicate incoming messages to the existing phone number; and deliver the duplicated incoming messages to the new phone number.

Clause 19: The system of Clause 17 or Clause 18, wherein the instructions, when executed by the at least one processor, controls the at least one processor to detect the delivery trigger by: receiving indications of an attempted cellular access point of the new NII; receiving indications of a cellular access point of the existing NII; and detecting the delivery trigger as to the cellular access point of the existing NII being a same access point as the attempted cellular access point of the new NII.

Clause 20: The system of any of Clauses 17-19, wherein the instructions, when executed by the at least one processor, controls the at least one processor to: monitor network activity of the new and existing NII; detect a deactivation trigger; determine an inactive NII and an active NII of the new and existing NII based on the monitored network activity; and deactivate the inactive NII.

Clause 21. A non-transitory computer-readable medium having stored thereon computer program code that, when executed by a processor, instructs the processor to perform the method according to any of claims 1-16.

Clause 22. An apparatus comprising: a processor; and a memory having stored thereon computer program code that, when executed by the processor, instructs the processor to perform the method according to any of claims 1-16.

What is claimed is:

1. A method comprising:
   detecting a delivery trigger indicative of delivery of a new User Equipment (UE) to a user, the new UE having a new subscriber identity module (SIM) card associated with a new phone number, the user having an existing UE with an existing SIM card associated with an existing phone number, the new phone number being different from the existing phone number; and
   duplicating the existing phone number with the new phone number by instructing network devices to:
      block incoming telephony messages to the new phone number from third parties;
      spoof outgoing message from the new phone number to present as if originating from the existing phone number;
      duplicate incoming messages to the existing phone number; and
      deliver the duplicated incoming messages to the new phone number.

2. A method comprising:
   detecting a delivery trigger indicative of delivery of a new User Equipment (UE) to a user, the new UE having new network identification information (NII) associated with a new phone number, the user having an existing UE with an existing NII associated with an existing phone number, the new phone number being different from the existing phone number; and
   duplicating the existing phone number with the new phone number by instructing network devices to:
      block incoming telephony messages to the new phone number from third parties;
      spoof outgoing message from the new phone number to present as if originating from the existing phone number;
      duplicate incoming messages to the existing phone number; and
      deliver the duplicated incoming messages to the new phone number.

3. The method of claim 2, wherein
   the new phone number is assigned to the new NII before detecting the delivery trigger, and
   the method further comprises disallowing telephony communications to and from the new phone number prior to detecting the delivery trigger.

4. The method of claim 2, wherein detecting the delivery trigger comprises:
   receiving indications of an attempted cellular access point of the new NII;
   receiving indications of a cellular access point of the existing NII; and
   detecting the delivery trigger as to the cellular access point of the existing NII being a same access point as the attempted cellular access point of the new NII.

5. The method of claim 2, wherein detecting the delivery trigger comprises one from among a delivery notification from a delivery agent, location information of new UE indicating that the new UE is within a predetermined area, location information of new UE indicating that the new UE is within a predetermined distance from the existing UE, and a notification from the existing UE that the new UE has attempted short-range connection therewith.

6. The method of claim 5 further comprising:
   receiving indications of a plurality of attempted cellular access points of the new NII; and
   determining an estimated location of the new NII by triangulating the estimated location of the new NII based on known locations of the plurality of attempted cellular access points.

7. The method of claim 6 further comprising identifying a new subscriber identity module (SIM) shipped with new UE, and associating an International Mobile Subscriber Identity (IMSI) of the new SIM with the user.

8. The method of claim 2 further comprising swapping phone number assignments between the new and existing NII.

9. The method of claim 8, wherein swapping phone number assignments between the new and existing NII comprises:
   assigning the new phone number to a transfer NII, freeing the new NII;
   assigning the existing phone number to the new NII, freeing the existing NII; and
   assigning the new phone number to the existing NII, freeing the transfer NII.

10. The method of claim 8, wherein swapping phone number assignments between the new and existing NII comprises:
    assigning the existing phone number to a transfer NII, freeing the existing NII;
    assigning the new phone number to the existing NII, freeing the new NII; and
    assigning the existing phone number to the new NII, freeing the transfer NII.

11. The method of claim 2 further comprising:
    monitoring network activity of the new and existing NII;
    detecting a deactivation trigger;
    determining an inactive NII and an active NII of the new and existing NII based on the monitored network activity; and
    deactivating the inactive NII.

12. The method of claim 11 further comprising:
    determining that the existing phone number is assigned to the inactive NII; and
    assigning the existing phone number to the active NII before deactivating the inactive NII.

13. The method of claim 11, wherein deactivating the inactive NII comprises de-duplicating the existing phone number with the new phone number.

14. The method of claim 11, wherein detecting the deactivation trigger comprises one from among a time out, a notification from the user, and a shipment notification from a delivery agent.

15. The method of claim 2 further comprising assigning the new phone number to the existing NII.

16. A system comprising:
    at least one processor; and
    at least one memory having stored thereon instructions that, when executed by the at least one processor, controls the at least one processor to:
       detect a delivery trigger indicative of delivery of a new User Equipment (UE) to a user, the new UE having new network identification information (NII), the user having an existing UE with an existing NII associated with an existing phone number;

activate the new UE and assign a new phone number to the new NII, the new phone number being different from the existing phone number; and duplicate the existing phone number with the new phone number by instructing network devices to:

block incoming telephony messages to the new phone number from third parties;

spoof outgoing message from the new phone number to present as if originating from the existing phone number;

duplicate incoming messages to the existing phone number; and deliver the duplicated incoming messages to the new phone number.

17. The system of claim 16, wherein the instructions, when executed by the at least one processor, controls the at least one processor to detect the delivery trigger by:

receiving indications of an attempted cellular access point of the new NII;

receiving indications of a cellular access point of the existing NII; and detecting the delivery trigger as to the cellular access point of the existing NII being a same access point as the attempted cellular access point of the new NII.

18. The system of claim 16, wherein the instructions, when executed by the at least one processor, controls the at least one processor to:

monitor network activity of the new and existing NII;

detect a deactivation trigger;

determine an inactive NII and an active NII of the new and existing NII based on the monitored network activity; and deactivate the inactive NII.

\* \* \* \* \*